No. 714,372. Patented Nov. 25, 1902.
R. HERZOG.
GARMENT STAY.
(Application filed Apr. 14, 1902.)

(No Model.)

WITNESSES:
J. J. Laass
G. Van Vorst

INVENTOR
Rudolph Herzog
By E. Laass
ATTORNEY.

UNITED STATES PATENT OFFICE.

RUDOLPH HERZOG, OF SYRACUSE, NEW YORK.

GARMENT-STAY.

SPECIFICATION forming part of Letters Patent No. 714,372, dated November 25, 1902.

Application filed April 14, 1902. Serial No. 102,844. (No model.)

*To all whom it may concern:*

Be it known that I, RUDOLPH HERZOG, a citizen of the United States, and a resident of Syracuse, in the county of Onondaga, in the State of New York, have invented new and useful Improvements in Garment-Stays, of which the following, taken in connection with the accompanying drawings, is a full, clear, and exact description.

The object of this invention is to form coat-fronts and other convexed stays for garments in an expeditious, inexpensive, and thorough manner to retain said parts in their requisite convexed shape; and to that end the invention consists of a garment-stay shaped concavo-convex and formed of a plurality of layers of fabric all flexed into corresponding curvatures and disposed with their convex side contiguous to the concave side of the adjacent layer and united by stitches passing through the assembled layers radially in relation to the curvature thereof, as hereinafter more fully explained.

Figure 1:
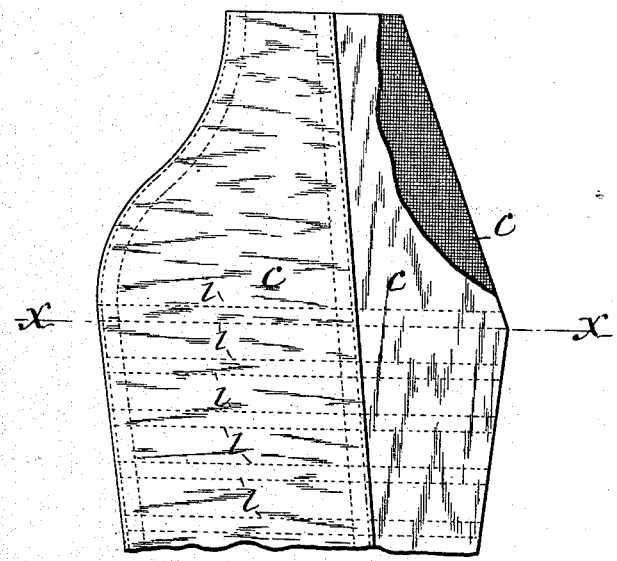
Figure 2:
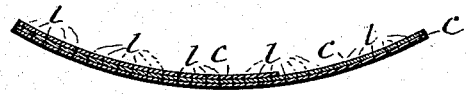

In the annexed drawings, Figure 1 is a face view of a coat-front embodying my invention. Fig. 2 is a transverse section on line X X in Fig. 1, and Fig. 3 is a transverse section of the means employed in the process of manufacturing said coat-front or other convexed garment-stay.

Figure 3:
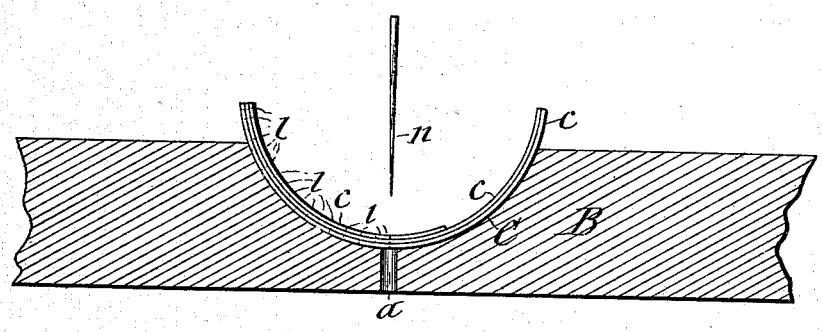

To accomplish the object of my said invention, I employ on the bed of the sewing-machine a supplemental bed B, as represented in Fig. 3 of the drawings. This supplemental bed consists of a block formed with a concavity C, extending across the block and provided in the center of said concavity with an aperture $a$ for the passage of the needle $n$ of the sewing-machine.

$c$ $c$ $c$ represent a plurality of layers of fabric, which may be either canvas and the usual cloth-lining with or without intervening haircloth, as may be desired. In uniting these layers of fabric I place them jointly in the concavity C of the supplemental bed B, so as to conform said layers to the curvature of said concavity and cause the successive layers to lie with their convex sides contiguous on the concave side of the adjacent layer, as shown in Fig. 3 of the drawings. This curvature is considerably greater than that required of the convexity of the stay to be formed for the reason hereinafter explained.

In passing the curved assembled sheets or layers of fabric through the cavity C while the sewing-machine is in motion a row of stitches is made across said combined layers, and by shifting said layers laterally after each passage a plurality of rows of stitches are made across the combined layers of fabric, as shown at $l$ $l$ $l$, and thus unite the same in a compact manner and in a curved condition, the curvature being produced by the rows of stitchings passing through the combined fabrics radially in relation to the curvature thereof.

Inasmuch as the fabrics are liable to become stretched to some degree out of their curved condition, the curvature of the cavity C in the supplemental bed B is made considerably in excess to the curvature required in the combined fabrics, as hereinbefore stated, the difference in the curvature being shown in Fig. 2 compared with Fig. 3 of the drawings.

What I claim as my invention is—

A garment-stay shaped concavo-convex and formed of a plurality of layers of fabric all flexed into corresponding curvatures and disposed with their convex side contiguous to the concave side of the adjacent layer and united by stitches passing through the assembled layers in directions radial in relation to the curvature thereof.

RUDOLPH HERZOG.

Witnesses:
J. J. LAASS,
A. F. KENNEDY.